(12) United States Patent
Guarin Aristizabal et al.

(10) Patent No.: US 11,460,566 B2
(45) Date of Patent: Oct. 4, 2022

(54) RECEIVER UNITS AND SYSTEMS WITH MISMATCH FILTERS FOR MIMO RADAR, AND DESIGN METHODS THEREFOR

(71) Applicant: NXP USA, INC., Austin, TX (US)

(72) Inventors: Gustavo Guarin Aristizabal, Munich (DE); Ralf Reuter, Landshut (DE); Maik Brett, Taufkirchen (DE)

(73) Assignee: NXP USA, Inc., Austin, TX (US)

( * ) Notice: Subject to any disclaimer, the term of this patent is extended or adjusted under 35 U.S.C. 154(b) by 369 days.

(21) Appl. No.: 16/710,540

(22) Filed: Dec. 11, 2019

(65) Prior Publication Data
US 2020/0264295 A1    Aug. 20, 2020

(30) Foreign Application Priority Data

Feb. 19, 2019  (EP) ..................................... 19158065

(51) Int. Cl.
*G01S 13/00* (2006.01)
*G01S 7/288* (2006.01)
(Continued)

(52) U.S. Cl.
CPC ............ *G01S 13/003* (2013.01); *G01S 7/023* (2013.01); *G01S 7/288* (2013.01); *G01S 7/295* (2013.01); *G01S 13/526* (2013.01); *G01S 13/931* (2013.01); *H04B 7/0413* (2013.01); *G01S 7/2883* (2021.05)

(58) Field of Classification Search
None
See application file for complete search history.

(56) References Cited

U.S. PATENT DOCUMENTS

| 4,353,067 | A | 10/1982 | Mims |
| 8,380,770 | B1 | 2/2013 | Nuthalapati |

(Continued)

FOREIGN PATENT DOCUMENTS

DE    4231311 C2    6/1998

OTHER PUBLICATIONS

Aittomakl, T., "MIMO-Radar Filterbank Design for Interference Mitigation", 2014 IEEE International Conference on Acoustic, Speech and Signal Processing (ICASSP), IEEE 2014.

(Continued)

*Primary Examiner* — Whitney Moore

(57) ABSTRACT

A receiver unit is disclosed for use in a multiple-input-multiple output, MIMO, radar system having a plurality of transmitters each for transmitting one of a group of orthogonal digital-transmitter-signals on a carrier wave, the receiver unit configured and adapted to receive a raw-analog-signal on a carrier wave reflected from one or more target objects. The receiver unit comprises: a down-converter configured to extract the raw-analog-signal from the carrier wave; an analog-to-digital converter configured to derive a raw-digital-signal from the raw-analog-signal; a plurality of filter units, each filter unit associated with a different one of the digital-transmitter-signals, operable on the raw-digital-signal and configured to identify reflection-event sequences in the raw-digital-signal; and a time-frequency transform sub-unit; wherein each filter unit comprises a mismatch filter having predetermined filter coefficients and designed to reduce the magnitude of side-lobes associated with a reflection-event sequence in the raw-digital-signal. Associated systems and methods are also disclosed.

14 Claims, 8 Drawing Sheets

(51) Int. Cl.
*G01S 7/295* (2006.01)
*G01S 13/526* (2006.01)
*G01S 13/931* (2020.01)
*H04B 7/0413* (2017.01)
*G01S 7/02* (2006.01)

(56) References Cited

U.S. PATENT DOCUMENTS 8,928,524 B1 1/2015 Nunn et al.
2018/0252809 A1 9/2018 Davis et al.

OTHER PUBLICATIONS

Colone, F., "DVB-T Signal Ambiguity Function Control for Passive Radars", EEE Transactions on Aerospace and Electronic Systems, vol. 50, No. 1, Jan. 2014.
Davis, M., "Minimum Integrated Sidelobe Ratio Filters for MIMO Radar", IEEE Transactions on Aerospace and Electronic Systems, vol. 51, No. 1, Jan. 2015.
Hu, L., "Optimal Mismatched Filter Bank Design for MIMO Radar via Convex Optimization", IEEE 2010.
Rabaste, O., "Mismatched Filter Optimization for Radar Applications Using Quadratically Constrained Quadratic Programs", IEEE Transactions on Aerospace and Electronic Systems, vol. 51, No. 4, Oct. 2015.
Tian, Y., "Adaptive Pulse Compression of MIMO Radar Based on SIC", 5th International Conference on Computer Sciences and Automation Engineering (ICCSAE 2015).

RECEIVER UNITS AND SYSTEMS WITH MISMATCH FILTERS FOR MIMO RADAR, AND DESIGN METHODS THEREFOR

CROSS-REFERENCE TO RELATED APPLICATIONS

This application claims the priority under 35 U.S.C. § 119 of European Patent application no. 19158065.3, filed on 19 Feb. 2019, the contents of which are incorporated by reference herein.

FIELD

This disclosure relates to receiver units and receiver systems for use in multiple-input-multiple output, MIMO, radar systems. It further relates to methods for designing filters for use in such receiver units and receiver systems.

BACKGROUND

Recent years have seen a significant increase in interest in the topic of multiple-input-multiple-output (MIMO) radar systems for commercial applications. Whereas MIMO radar systems have been known and used for many years in high-cost high-performance applications, these have typically been limited to military or scientific applications, in which the associated costs are justifiable. However, the recent drive towards autonomous and semi-autonomous driving, in particular, has resulted in pressure to develop radar systems which are increasingly advanced, and yet affordable enough to be used in consumer applications.

As a result, MIMO digitally modulated radar is being developed for use primarily in automobile applications. Automobile radar applications provide significant challenges, in particular to the signal processing of reflected radar signals, since the application environment generally includes multiple targets, and targets with very different cross sections—in which the strength of the reflected signals from different targets may differ by between 20 and 30 dB, or more. Furthermore, for applications such as autonomous driving, the signal processing to yield target acquisition and target tracking must be performed rapidly, and within the constraints of the processing capability on-board the vehicle. This presents challenges to the design of the MIMO receivers, and in particular the signal processing therein.

Whereas, hereinafter in this disclosure, autonomous and quasi-autonomous driving will be used as an example application, the skilled person will appreciate that the disclosure is not limited thereto, but may be equally relevant to other applications in which multiple targets and targets with varying cross sections must be acquired and tracked at affordable cost and relatively quickly. These include but are not limited to commercial and consumer drone applications, commercial and consumer maritime applications, and other applications requiring navigation in a non-empty environment.

SUMMARY

According to a first aspect of the present disclosure, there is provided a receiver unit for use in a multiple-input-multiple output, MIMO, radar system having a plurality of transmitters each for transmitting one of a group of orthogonal digital-transmitter-signals on a carrier wave, the receiver unit configured and adapted to receive a raw-analog-signal on the carrier wave reflected from one or more target objects, the receiver unit comprising: a down-converter configured to extract the raw-analog-signal from the carrier wave; an analog-to-digital converter configured to derive a raw-digital-signal from the raw-analog-signal; a plurality of filter units; each filter unit associated with a different one of the digital-transmitter-signals, operable on the raw-digital-signal and configured to identify reflection-event sequences in the raw-digital-signal; and a time-frequency transform sub-unit, configured to identify a frequency associated with a reflection-event sequence; wherein each filter unit comprises a mismatch filter having predetermined filter coefficients and designed to reduce the magnitude of side-lobes associated with a reflection-event-sequence in the raw-digital-signal.

In one or more embodiments, each filter unit further comprises a match filter configured to cross-correlate the raw-digital-signal with the respective transmitter-signal. The match filter may cross-correlate the raw-digital-signal with the respective transmitter-signal by comparing sections of the raw-digital-signal with the unit-sequence of the respective digital-transmitter-signal.

In one or more other embodiments, the mismatch filter is further designed to maximise the signal-to-noise-ratio, SNR, for the reflection event, thereby providing a correlation function between the raw-digital-signal and the respective transmitter-signal. The match filter may thus be redundant and not required.

In one or more embodiments the receiver unit further comprises a coherent adder operable on the raw-analog-signal. The coherent adder operates on the multiple sequences of the raw-analog-signal, and may improve a signal-to-noise ratio of the raw-analog-signal.

In one or more embodiments the time-frequency transform sub-unit is configured to perform fast Fourier transforms, FFT. Other embodiments may be configured to use other discrete transforms.

According to another aspect of the present disclosure there is provided a receiver system comprising a plurality of receiver-units as described above and further comprising an angle-calculation-unit configured to perform a FFT on an output of the time-frequency transform sub-unit and to determine an angle between a target object and a reference direction. The receiver system may further comprise a target-detection unit, configured to localise targets from the angle, an output of the time-frequency transform sub-unit, and a reflection-event sequence. The receiving system may comprise r receiver units and may be operable with a group of up to M transmitters, wherein each receiver unit comprises at least M filter units, each associated with a different one of the group of transmitters and having predetermined filter coefficients derived for the respective digital-transmitter-signal.

According to a yet further aspect of the present disclosure, there is provided an integrated circuit comprising a receiver system as described above, and a respective transmitter circuit for use in each of the plurality of transmitters.

According to another aspect of the present invention there is provided a method of designing a mismatch filter having n filter coefficients hi, where i equals 1 to n, for use in a receiver unit as claimed in any of claims 1 to 6 or a receiver system as claimed in claims 7 to 11, the mismatch filter having filter coefficients h, the method comprising: generating M vectors Xi of size n; calculating a Toeplitz matrix M(i) for each vector Xi; initialising a sidelobe weighting vector v={1/N1, 1/N . . . , 1/N} of length k, wherein k>=M; initialising a matrix B with 0 in all elements; and iteratively calculating the filter coefficients h, from {M(i)} and v.

The vectors Xi may correspond to an expected output of respective match filter for each transmitter channel. In one or more other embodiments, the vectors Xi correspond to the unit sequences for each transmitter channel. A least squares method may be used to iteratively calculate the filter coefficients.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as any other non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
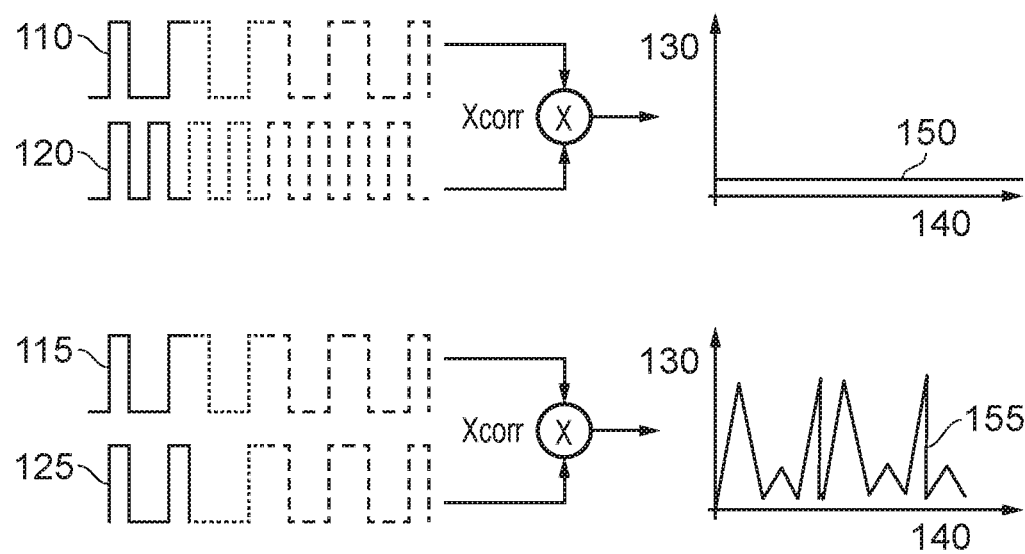
FIG. 1 illustrates the concept of cross-correlation of orthogonal signals.

It should be noted that the figures are diagrammatic and not necessarily drawn to scale. Relative dimensions and proportions of parts of these figures may be shown exaggerated or reduced in size; for the sake of clarity and convenience in the drawings. The same reference signs are generally used to refer to corresponding or similar features in modified and different embodiments

DETAILED DESCRIPTION OF EMBODIMENTS

In a digitally modulated radio signal for use in MIMO radar, a digital sequence, or code, is used to modulate the carrier signal in the transmitter. The digital signal can be a binary signal or a signal with a high constellation of values, that is to say, the signal may take any of three or more discrete levels.

For a good understanding of the present disclosure, first of all, two concepts will be discussed, which are relevant to the design of MIMO digitally modulated radar systems. The first is the concept of orthogonal codes, and the related concept of cross-correlation of orthogonal codes; the second is that of autocorrelation.

FIG. 1 illustrates the concept of orthogonal codes or signals: in the case that the two signals, 110; 120, are perfectly orthogonal, as shown in the top half of the figure, there is zero cross-correlation between them, as shown on the graph on the upper righthand side, plotting amplitude 130 of cross-correlation against time 140. The graph shows that the cross-correlation 150 is unchanging and zero.

In contrast, where the two signals are not perfectly orthogonal, as shown for signals 115 and 125 in the lower half of the figure, the cross-correlation signal is not zero, but varies over time. This is shown on the graph on the lower righthand side plotting amplitude 130 of cross-correlation against time 140, in which the cross-correlation 155 is shown to be non-zero and changing over time.

The second concept is autocorrelation. This refers to the extent to which a signal is a copy of a delayed version of itself. An example of this which is easy to understand in the analogue domain is a perfect sign-wave: the signal is an exact match to a copy of itself offset by a phase of $2\pi$.

Figure 2:
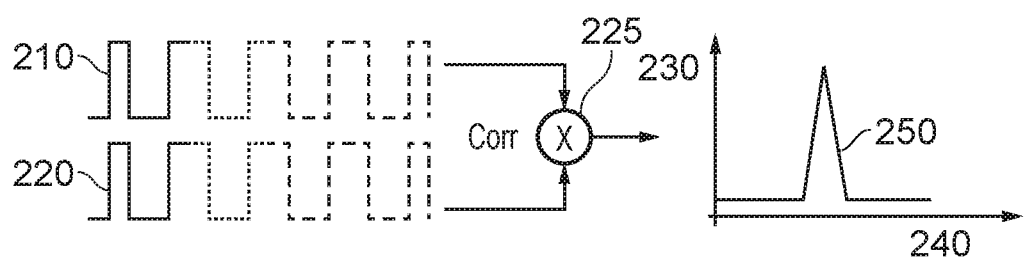
FIG. 2 illustrates the concept of autocorrelation between versions of the same signal.
Figure 2:
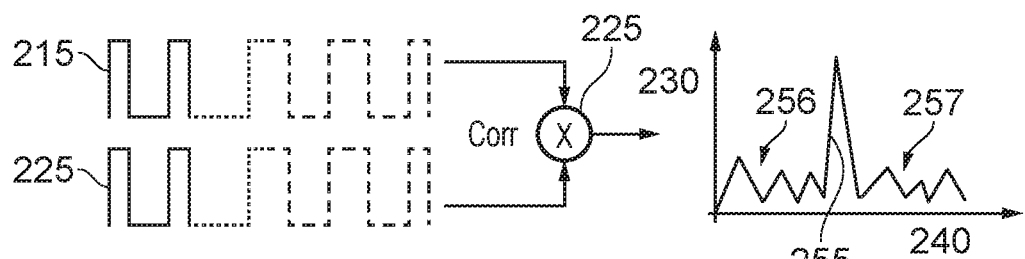

Two signals 210 and 220 with ideal or perfect autocorrelation are shown in the top half of FIG. 2. When these signals are cross-correlated in correlator 225 The graph of amplitude 230 against time 240 shows a single peak 250. The peak corresponds to the gap (in time) between the original signal and the matching delayed version.

In contrast, the lower half of FIG. 2 shows the situation for two signals 215 and 225 with non-ideal autocorrelation. In this case, the cross-correlation signal results in a graph of amplitude 230 against time 240 which includes the main peak 255, and in addition to this main peak it includes side lobes 256 and 257.

Side lobes are of particular concern in digitally modulated MIMO radar applications, as will be discussed in more detail hereinbelow.

Figure 3:
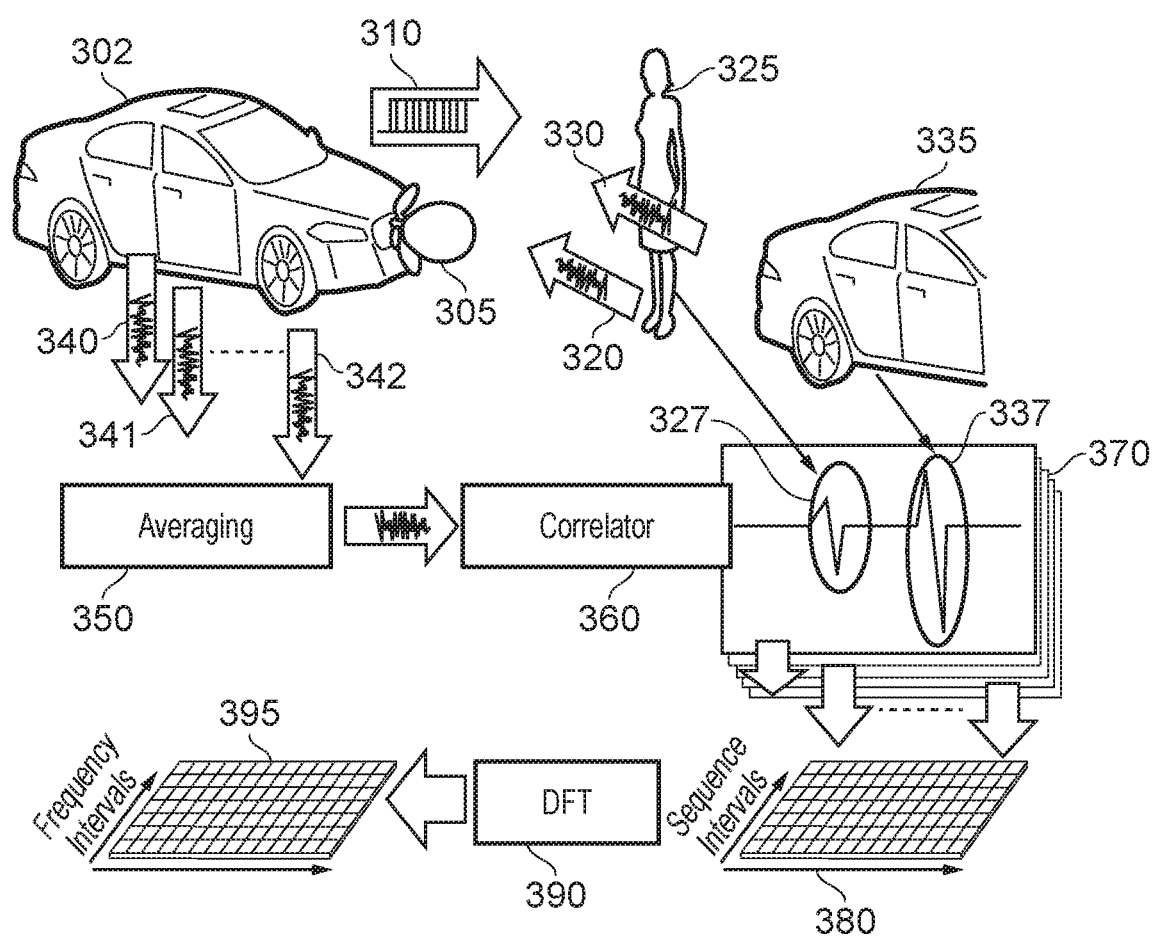
FIG. 3 shows a schematic of an automotive digitally modulated radar system.

Turning now to FIG. 3, an overview of an automotive digitally modulated radar system will be described. A transmitter 305, which as shown is mounted in or on a vehicle 302, transmits a signal 310, which is a digitally modulated signal carried on a carrier wave. The carrier wave is typically a high-frequency wave, the frequency being in a frequency band allocated to automotive radar, such as those around 77 GHz, defined by national and international regulatory bodies such as FCC in US, CEPT in Europe. The signal is reflected by one or more targets, which may be stationary or moving. The figure shows two targets, being a person 325 and another vehicle 335 which respectively reflect signals 320 and 330. A receiver (not shown) mounted on or in vehicle 302 receives a high-frequency signal 340, which is a combination of the reflected signals 320 and 330, each on the carrier wave.

The transmitter typically sends multiple bursts of the transmitted signal 310 on the carrier wave. This results in series of reflected signals (shown as 340, 341 342 in the figure). The receiver down-converts the high-frequency signal, and then digitises the result, to extract the combination of reflected signals. The series of signals may be averaged, in order to improve the signal-to-noise ratio, as shown at 350 in FIG. 3.

The resulting average signal is then passed through a correlator 360. The correlator 360 cross-correlates the reflected average signal with the original digital sequence used by the transmitter. There results a digital data set, or stream, from which it should be possible to identify the separate targets. In the case shown, the person 325 is closer to the transmitter and receiver than the vehicle 335. As a result the reflected signal 320 from the person 325 has a shorter total-time-of-flight than that 330 from the vehicle 335: these are identifiable as separate non-zero features on the plot of reflected signal amplitude against time. Using the speed of light—or in this case the speed of the high-frequency carrier wave which amounts to the same thing—the distance between each target and the vehicle can be calculated as shown at distance calculation function 370. In this instance, the reflected signal 327 from the person is clearly visible ahead of the reflected signal 337 from the vehicle. Moreover, the magnitude of amplitude of the reflected signal for the person is smaller than that for the vehicle (that is to say the cross-section of the person the smaller than that of the vehicle), which provides ontological information about the target. (Note that the strength of the reflected signal does depends not only on the size of the target but on other factors such as the reflectivity of the target surface, and the extent to which the surface scatters the incoming signal). This can be captured, as shown, on a plot of sequence intervals 380.

Whereas the reflected signal from a single transmitter to a single receiver can only provide a single distance or range datum at any one moment, by using a plurality of transmitters and/or a plurality of receivers in a MIMO a system, multiple range data may be determined from separate, isolated, signals: since the separate transmitters of separate received are spatially separated (even though that may only be by a few centimetres), digital beamforming (in which the phases of multiple transmitted signals are controlled in order to control the directionality of the beam through constructive and destructive interference) may be used to determine not only the distance but the location in 2-D (or even 3-D) space of each of the targets. Alternatively, though generally less preferred, triangulation may provide for determining an angle between the target and a reference direction. Clearly the most natural choice of the reference direction is directly forward from the transmitting vehicle, although this is not necessary.

As will be familiar to the skilled person, not only can position information be derived from the reflected signals, but the Doppler effect may be used to determine in particular radial velocity of the targets. In order to do this, the reflected signals for each transmitter-receiver pair are converted to the frequency domain using a transform such as a Discrete Fourier Transform (DFT) 390 or other Fast Fourier Transform (FFT). Doppler shift of the reflected signals, relating to each of the targets, can then be isolated as a series of frequency intervals 395 to determine their radial velocity with respect to the transmitter-receiver pair. Again, use of multiple pairs of transmitter-receiver provides the capability to determine the radial velocity of the individual targets.

As briefly mentioned above, the correlator 360 provides for a cross-correlation with the original digital sequence sent by the transmitter. If there are multiple transmitters, with number M, such as the case in MEMO systems, each of the M transmitters may use a different orthogonal sequence, and a separate cross-correlation is then required to be carried out with respect to each transmitted sequence. That is to say, the receivers each have to perform a set of M cross-correlations, one for each transmitter. Thus, in a MIMO system all the transmitters can transmit at the same time allowing providing for an increase in the angular resolution of the radar system. That is to say, not only does each transmitter send to each receiver, such that the separation of the receivers allows for the calculation of angular localisation of the target, but each receiver can reconstruct the signal from each transmitter such that the spatial separation of the transmitters also provides for angular localisation.

Figure 4:
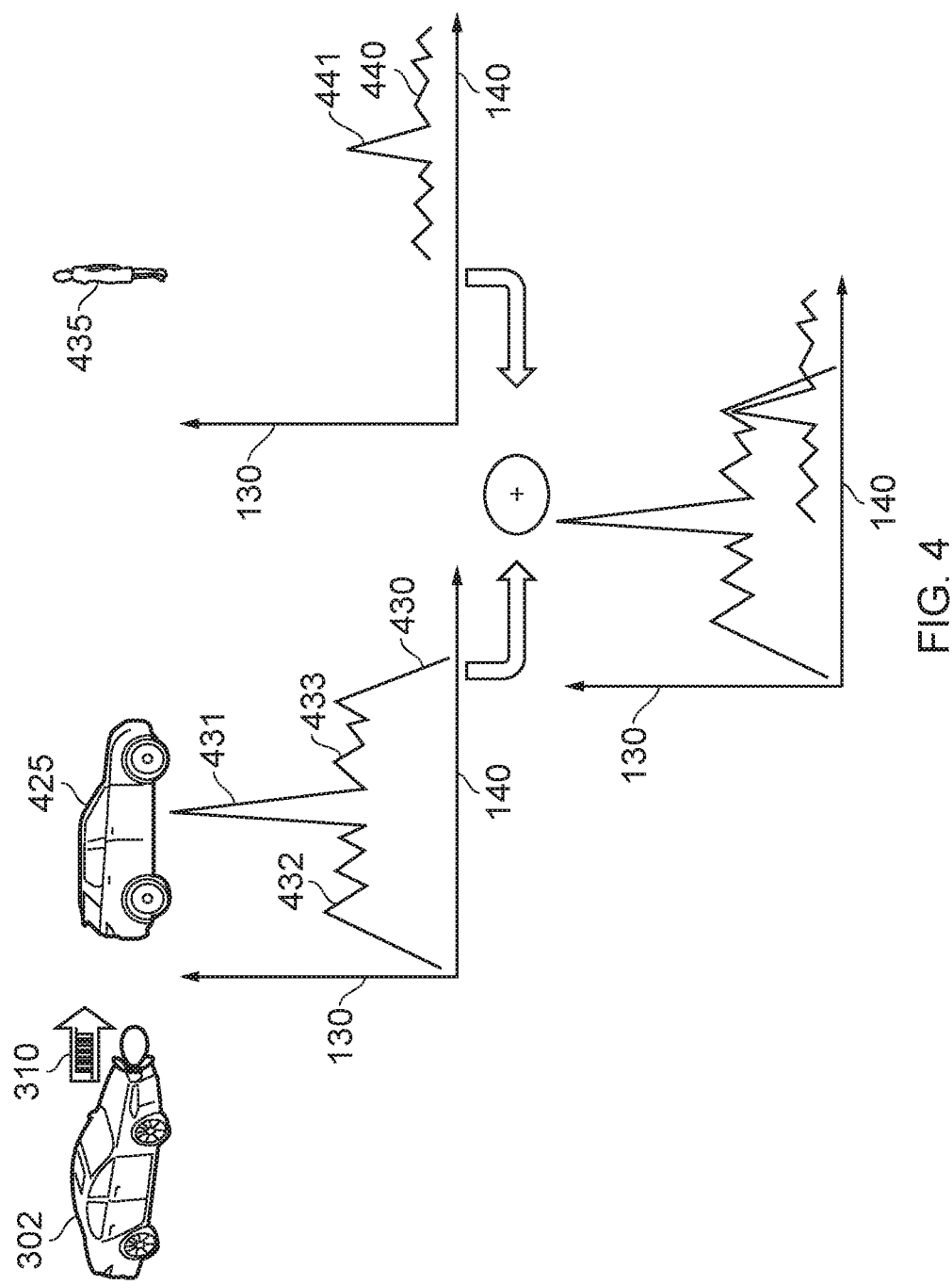
FIG. 4 illustrates a problem associated with radar targets having different reflection cross sections.

However, the problem of imperfect orthogonality of the separate sequences encoded as signals presents challenges to the above system: this will now be described with reference to FIG. 4. The figure shows the transmitted signal 310 from vehicle 302, reflected by two targets 425 and 435. In this case the target 425 is a near field target with a large reflection cross-section, such as a vehicle; the target 435 is a far field target with a significantly smaller reflection cross-section, such as person. The reflected signals plotted as amplitude 130 against time 140 for each of the individual targets, are shown at 430 and 440. Note that these plots are conceptual only, in that they represent the case that the respective target, and only that respective target, is present.

The large cross-section reflected signal 430 includes a main peak 431; however, it also includes side lobes 432 and 433, respectively in advance of and behind the main peak, as seen in the time domain. As is clear from the figure, the side lobes from the reflected signal having a higher cross-section may be comparable or even greater than the peak signal 441 from the smaller cross-section far field target. In that case the side lobe masks or shadows the far field object.

In order to properly identify the weaker far field target, the side lobes on the stronger near field target must be significantly reduced. Although there is at least one known method in the field communication systems which addresses this, by means of successive interference compensation methods, this method is computationally very expensive, and the complexity increases if the number of targets to be iteratively compensated is large. It is not an appropriate solution for real-time commercial automotive radar applications and the like.

Furthermore, in the case of a SISO (single input single output) radar system, the concept of a mismatched filter has been proposed, such as by the authors of US patent publication number U.S. Pat. No. 8,830,770-B1. The "mismatched filter" might be considered to be equivalent to a mismatch filter. However, the approach used is only applicable to SISO systems, since the optimisation function operates on side lobes of the autocorrelation. It would not be applicable to or transferable to MIMO radar systems.

The inventors of the present disclosure have come up with the unexpected appreciation that it is possible to reduce or optimise the side lobes of the cross-correlation as well as auto-correlation, thereby potentially improving the sensitivity for MIMO radar.

Figure 5:
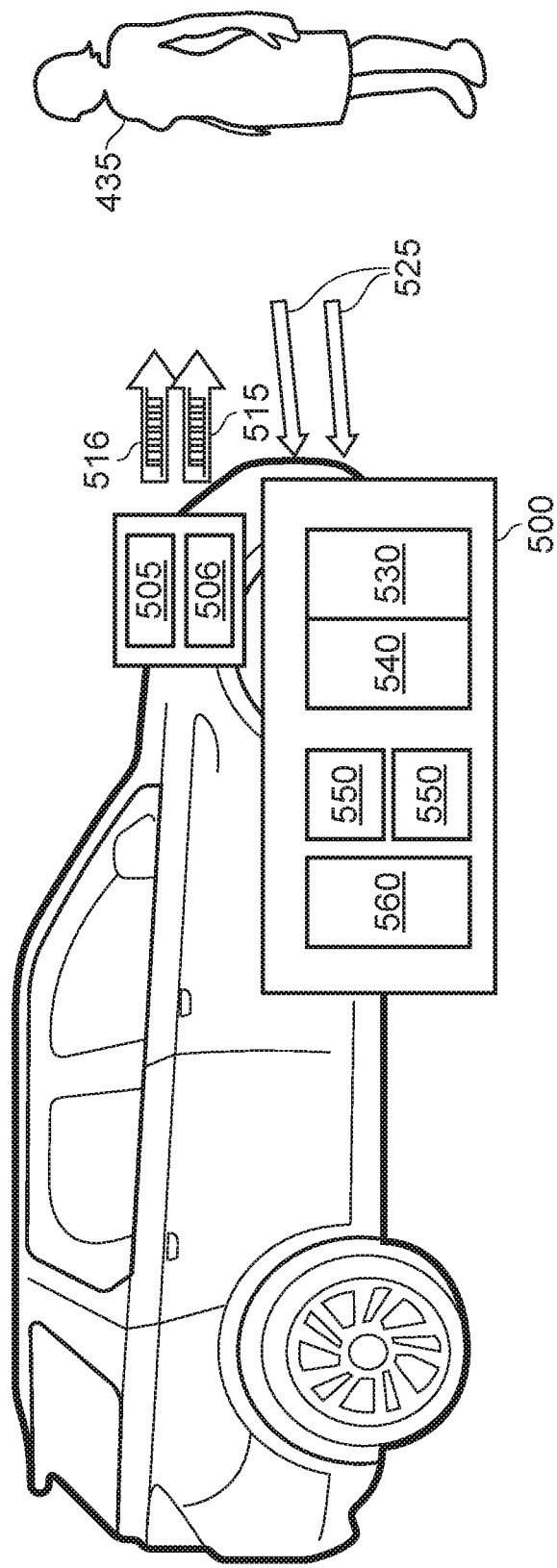
FIG. 5 shows, in schematic form, the components in an automotive digitally modulated radar system.

Referring now to FIG. 5, thus, there is disclosed herein a receiver unit 500 for use in a multiple-input-multiple output, MIMO, radar system having a plurality of transmitters 505, 506 each for transmitting one of a group of orthogonal digital-transmitter-signals 515, 516 on a carrier wave. The receiver unit is configured and adapted to receive a raw-analog-signal 525, on a carrier wave reflected from one or more target objects 435. The receiver unit comprises; a down-converter 530 configured to extract the raw-analog-signal from the carrier wave; an analog-to-digital converter 540 configured to derive a raw-digital-signal from the raw-analog-signal; a plurality of filter units 550, each filter unit associated with a different one of the digital-transmitter-signals (that is to say, each is associated with an individual signal from each transmitter), operable on the raw-digital-signal and configured to identify reflection-event sequences in the raw-digital-signal; and a time-frequency transform sub-unit 560 configured to identify a frequency associated with a reflection-event sequence. Each filter unit comprises a mismatch filter having predetermined filter coefficients and designed to reduce the magnitude of side-lobes associated with a reflection-event sequence in the raw-digital-signal.

The frequency output from the time frequency transform sub-unit 560 is associated with a Doppler shift arising from the velocity of the target object generating the reflection event sequences. Thus, by transforming to the frequency domain, a radial velocity of the target object may be readily obtained.

By predetermining the filter coefficients for each filter sub-unit the computational power in use is significantly reduced with respect to successful interference compensation methods.

In one or more embodiments each filter unit further comprises a match filter configured to cross-correlate the raw-digital-signal with the respective transmitter-signal. This is shown in the embodiment illustrated in FIG. 6.

Figure 6:
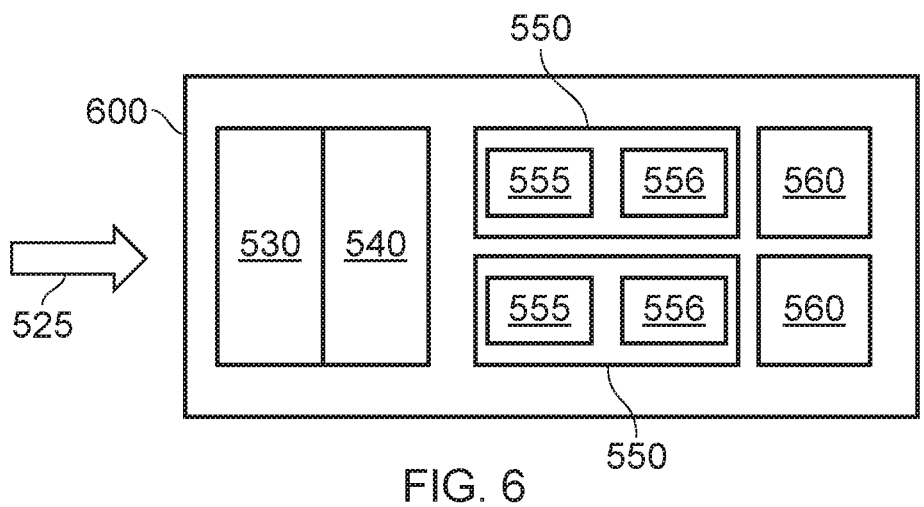
FIGS. 6 and 7 show, as nonlimiting alternatives, arrangements of the components in an automotive digitally modulated radar system.

It should be noted that relative to the receiver units 550 of FIG. 5, the receiver unit 600 of FIG. 6 is shown reflected in the X direction, in order to aid in comprehension of the present disclosure: whereas in FIG. 5, the reflected raw-analog-signal 525—reflected from the target—is shown input to the receiver unit from the right-hand side, in FIG. 6 the raw-analog-signal is depicted input from the left, in order to illustrate the flow in a way which is easier the reader to understand—that is from left to right. As shown in FIG. 6 each of the filter units 550 comprises a first sub-unit 555 which is the match filter, and a second sub-unit 556 which is the mismatch filter.

Thus, in this embodiment, the receiver unit is similar to a conventional receiver unit in which the correlator 360 corresponds to the group of match filters 555, except that there is an additional mismatch filter 556 associated with each match filter. The skilled person will associate that correlator 360 corresponding to the group of match filters includes a separate match filter to match against each of the orthogonal sequences transmitted by the set of transmitters—that is to say the number of match filters corresponds to the number of transmitters. Thus, correspondingly, in embodiments such as that shown in FIG. 6 there is a separate mismatch filter for each of the transmitters. Furthermore, the current inventors have appreciated that the mismatch filter to reduce the side lobes from a target, is not dependent on that target itself, but depends only on the sequence, or code, from the associated transmitter signal. Thus it is possible to design the mismatch filter based on the sequence of the respective transmitter, without reference to the target. That is to say, the filter may be predesigned.

Considered functionally, the match filter 555 provides the function of a range gate calculation, whereas the mismatch filter 556 provides the function of side lobes suppression. The time-frequency transform unit 560 provides the function of velocity calculation. Note that, as shown in FIG. 5, there may be a single time frequency transform unit 560 which operates on the output of each of the filters 550, alternatively and without limitation there may be a separate time frequency transform sub-unit for each filter, as shown in FIG. 6.

The skilled person will appreciate that the mismatch filter may be provided as hardware, or firmware. Alternatively, and conveniently, the mismatch filter may be provided as a set of filter coefficients, stored in memory.

Figure 7:
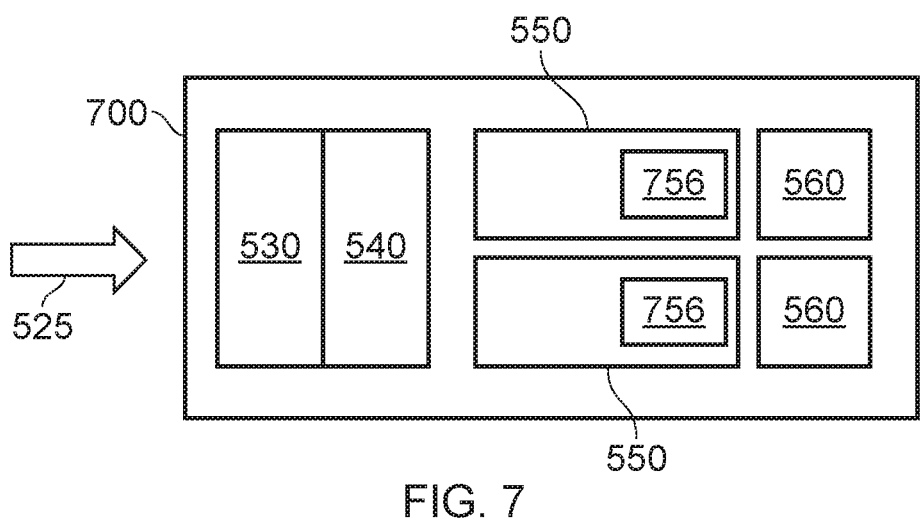

In one of more other embodiments, the mismatch filter is further designed to maximise the signal-to-noise-ratio, SNR, for the reflection event, thereby providing a correlation function between the raw-digital-signal and the respective transmitter-signal. This is illustrated in FIG. 7. The receiver unit 700 of FIG. 7 is similar to that of FIG. 6 except that in this case the mismatch filter 756 corresponding to each filter unit carries out a dual function: the first function replaces the match filter 555, and the second function reduces the side lobes, corresponding to mismatch filter 556. Thus in embodiments such as that shown in FIG. 7, a separate match filter is not required or provided.

In embodiments such as that shown in FIG. 7, the mismatch filter provides the dual function of range gate calculation and side lobe suppression, whilst, as before, the time frequency transform unit 560 provides for velocity calculation.

Figure 8:
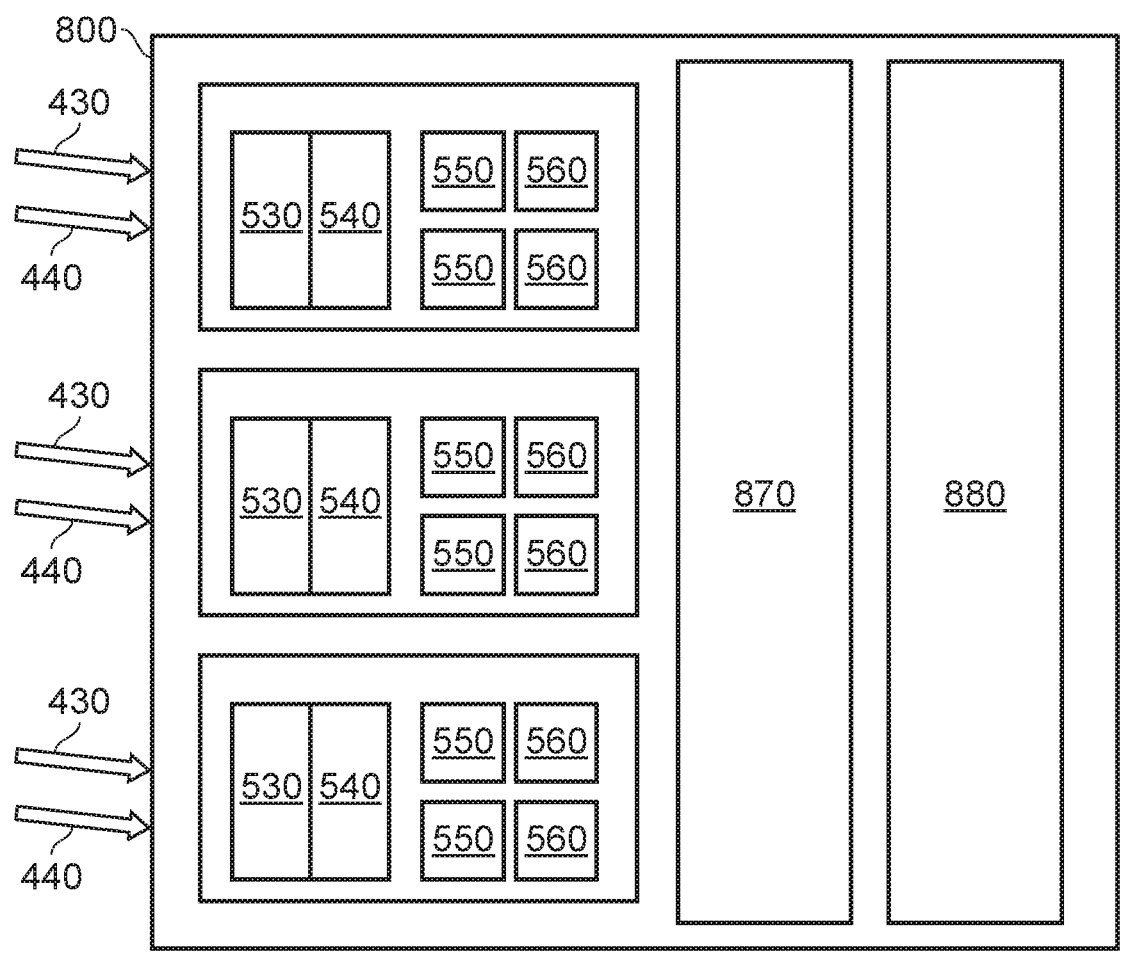
FIG. 8 shows, in schematic form, the components of an automotive digitally modulated radar system in more detail.

FIG. 8 illustrates another aspect of the present disclosure. FIG. 8 shows a receiver system 800 comprising a plurality of receiver units as described above, and further comprising an angle-calculation-unit 870 configured to perform a FFT on the outputs of each of the receiver units, and thereby to determine an angle of arrival for each target. The receiver system may further comprise a target-detection unit 880, configured to identify and categorise targets. The receiver system 800 may be contained in or consist of a single unit or integrated circuit or packaged device, or may be a group of separate units, integrated circuits or devices. Whereas a single unit provides for more convenient manufacturing and potentially overall lower cost, separate units or devices have the alternative advantage of being able to be spaced further apart on or in the vehicle, allowing for potentially greater spatial or angular resolution or both.

Alternatively, the set of individual receiver units may be manufactured on a single integrated circuit or co-packaged together, whereas the angle calculation unit 870 and/or the target detection unit if any may be located in a central controller, which may be remote in the vehicle from the receiver units. In this case, a single central controller may be used with a plurality of sets of individual receiver units.

Moreover, in the case that one or more receiver circuits are either manufactured on the same integrated circuit or are co-packaged together, one or more transmitter circuits for use in the respective one or more transmitters may be manufactured on the same integrated circuit as the set of individual receiver units, or maybe co-packaged together with the set of individual receiver units.

Alternatively, the receiver circuits may be configured to operate in conjunction with one or more transmitter circuits which are separately packaged from the receiver circuits. The one or more transmitter circuits themselves may be co-packaged, or manufactured on the same integrated circuit, or separately packaged.

Returning to FIG. 8, it will be apparent that the figure appears to show multiple reflected signals 440 and 430 from separate targets being input to the receiver units. However, the skilled person will understand that this separation is conceptual only, and shown merely to aid the understanding of the present disclosure; in practice the reflected signals are convolved into a single received raw-analog signal 525. The separate reflections are isolated as discussed above.

Turning now to the design of the mismatch filter, as the skilled person will be familiar, a filter corresponds to a vector having a set of filter coefficients h. The skilled person will appreciate that there are many alternative approaches to the design of a mismatch filter, with optimised filter coefficients. These methods include genetic algorithms (GA), linear programming algorithms (LP) and the like. However, particularly convenient is the use of a least mean squares algorithm (LMS).

Thus according to another aspect of the present disclosure there is provided a method of designing a mismatch filter for use in a receiver unit or receiver system as described above, the mismatch filter h having i filter coefficients hi, where i equals 1 to n, the method comprising: generating M vectors Xi of size n; calculating a Toeplitz matrix M(i) for each vector Xi; initialising a sidelobe weighting vector v={1/n, 1/n . . . , 1/n} of length k, wherein k>=M; and iteratively calculating the filter coefficients h, from {M(i)} and v.

Such a LMS method will now be described in more detail with reference to FIGS. 9 and 10. This method is applicable to embodiments in which the mismatch filter 556 is designed for use in conjunction with match filter 555. It is equally applicable to designs in which the mismatch filter incorporates the functionality of, and thereby replaces or makes redundant, match filter 555. Designs for the two types of embodiment differ only in that different vectors $X_i$ (as will be discussed below) are used.

In order to implement the method, in a first step 1010 a set M of vectors X (where i=1 to M), each vector having size n, are generated. n generally corresponds to the length of the sequence (which, as a nonlimiting example, in this case will be considered to be a binary sequence) of each of the orthogonal transmitted signals 110,120. The skilled person will be familiar that the length of the transmitted sequence, and thus the value of n, is typically between 512 and 4096.

In embodiments in which the mismatch filter incorporates the functionality of the match filter, the set of elements of each vector X is simply the sequence of the transmission to be transmitted by the respective transmitter. However, in the case that the match filter is used in conjunction with a mismatch filter, the elements of the vector X are set to be the expected output at the match filter for that respective transmitter channel.

In a next step 1020, for each vector $X_i$, a Toeplitz matrix M(i) is calculated. (The skilled person will be familiar that a Toeplitz matrix is one in which the vector X corresponds to the first column of the matrix, and the remaining elements of the matrix are determined such that each descending diagonal from left to right consists of the same element).

In a next step 1030, a sidelobe weighting vector V is initialised, such that V={1/n, 1/n . . . , 1/n} of length k, wherein k>=M (i.e. k is at least equal to the number of TX channels and thus to the maximum number of orthogonal signals that have to be detected at the receiver). In this example, as initialised, each element of vector V has the value 1/n, that is to say V={1/n, 1/n, . . . , 1/n}. The purpose of the initialisation is to provide a suitable starting point for the minimisation problem, and thus the skilled person may determine that other initialisation values are appropriate. The weighting vector is used to place weights—which are initially set to {0,0, . . . 0,0} for all elements of the cross-correlation, and to {1,0, . . . 0,0} for the auto-correlation K==i on the side lobes in the minimisation problem; the iterative solution of the minimisation problem is intended to improve the accuracy of those weights.

In a next step, 1040, a matrix B of size i by n is initialised with all matrix elements equal to 0. The matrix B is used in the least mean squares calculation.

Figure 9:
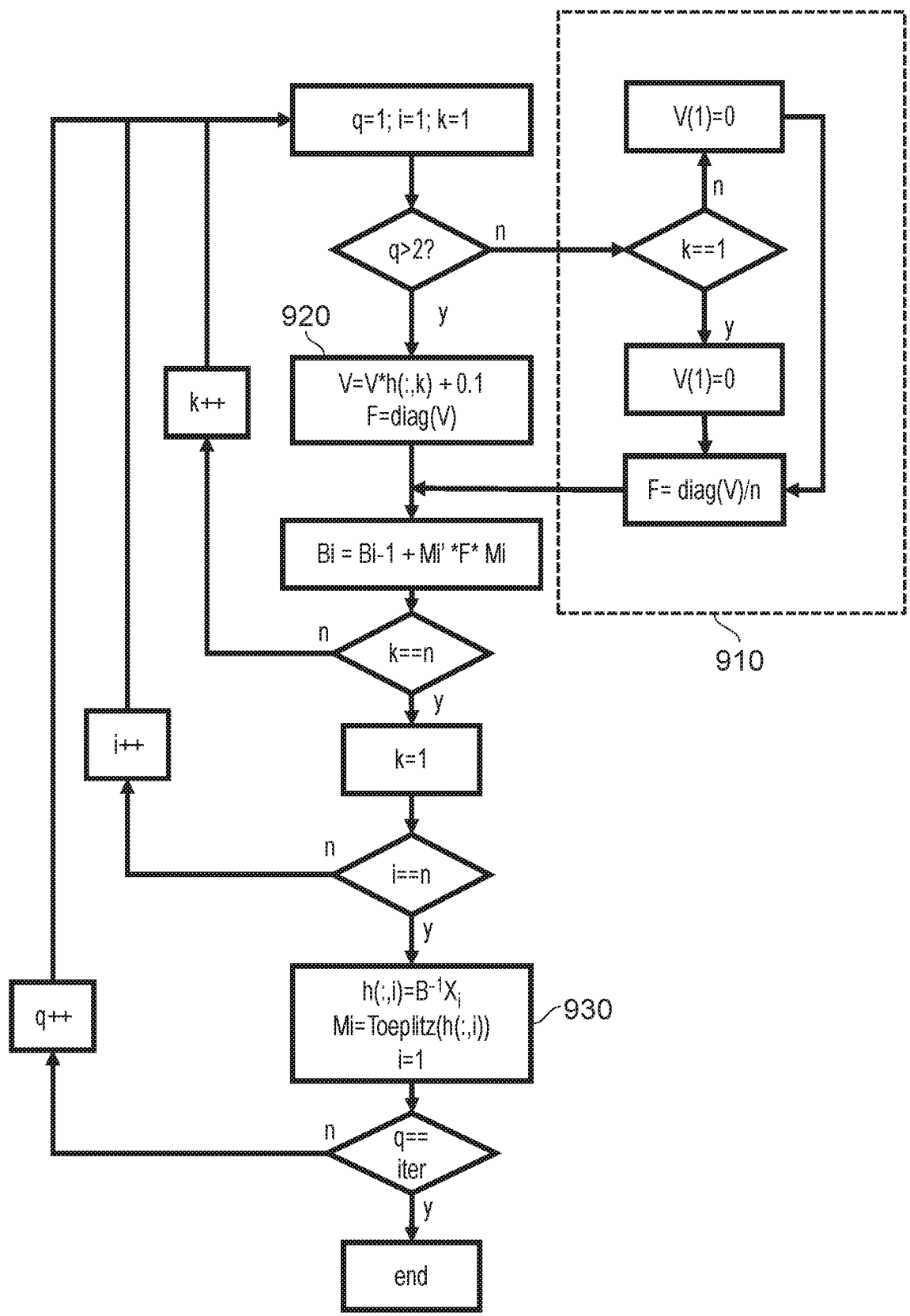
FIG. 9 shows a schematic of a method for designing a mismatch filter.
Figure 10:
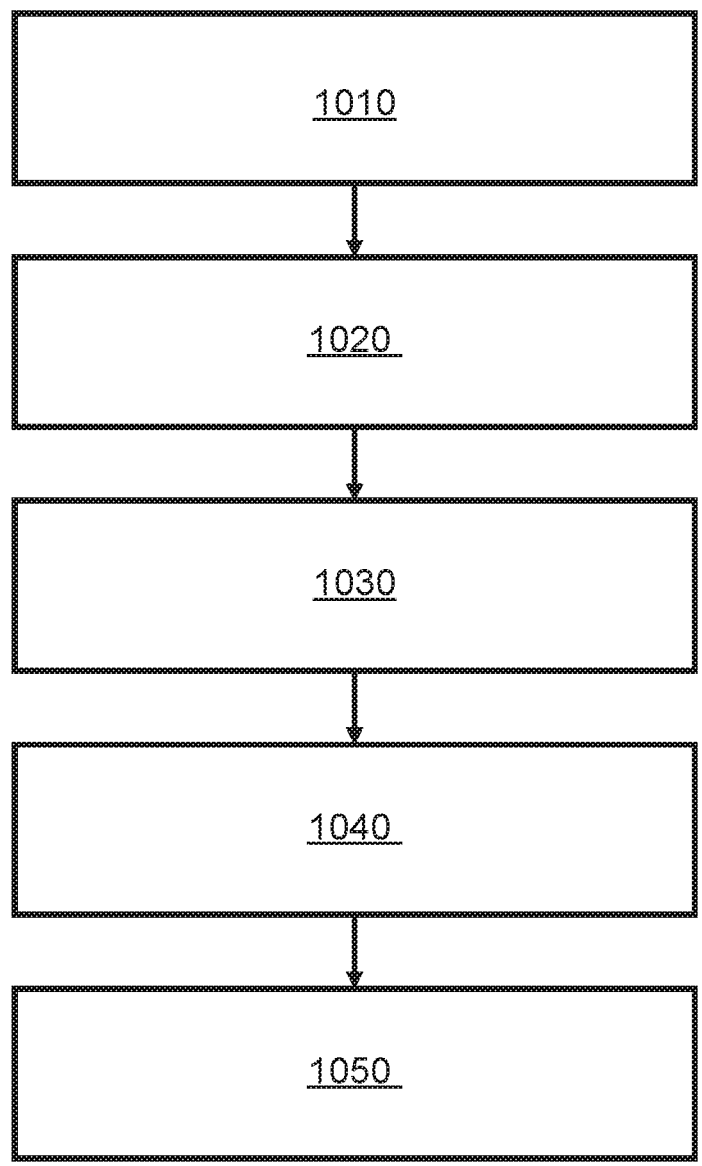
FIG. 10 shows the steps in such a method for designing a mismatch filter.

In a final step 1050, an iterative process is used as depicted in FIG. 9 to calculate the filter coefficients h for each transmitter. The number of iterations may be defined by the user and will vary according to the number of sequences used and the accuracy required.

The iteration process used is based on four nested loops:

In the innermost nest the individual coefficients of the vector V and F are calculated and the coefficients of the matrix B are updated. In the first iteration of the innermost nest, the first element of V is replaced by 1 if the outer-most loop and the second outer-most loop have the same amount of iterations. For different amount of iterations, the first element of the vector V remains zero. In the first iteration of the innermost nest, the vector F is calculated as the diagonal of the vector V with each element divided by n, as shown at 910.

For the second and subsequent iteration of the innermost nest (which has iteration counter k as shown in FIG. 9), the V vector value is updated, at 920, as the old value of the V vector multiplied by a vector h plus a constant factor 0.1, according to:

$$V = V * h(:,i) + 0.1,$$

where the vector h is an impulse response of the mismatch filter. For readers unfamiliar with the terminology, this update step means that the vector V with all the rows (:) and for the column k is multiplied by h.

In the inner nest, independently from the amount of iterations, the matrix B has to be updated by adding the resulting value of the multiplication of the transpose of the Toeplitz matrix with the vector F and the Toeplitz matrix to the old value of the matrix B according to the formula:

$$B\_i = B\_i - 1 + (Mi'^* F * Mi).$$

This is iterated over the two "intermediate" nests with counters i and k shown in FIG. 9.

As shown at 930, in the outermost nest (with counter q in FIG. 9), the vector h—having the coefficients of the filter—is calculated with a LMS process by multiplying the inverse of the matrix B with the vector X. Once the new vector h has been calculated, the matrix M is updated by calculating the Toeplitz matrix of the new vector h. This is shown at 930 in FIG. 9.

The procedure has to be repeated multiple times until the filter coefficients for all the channels have been calculated and until the optimization has been run a determined number of iterations defined by the user. The user determines an appropriate number of iterations according to experience, until an appropriate level of convergence of successive values of the coefficients is achieved.

From reading the present disclosure, other variations and modifications will be apparent to the skilled person. Such variations and modifications may involve equivalent and other features which are already known in the art of MIMO radar receivers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF REFERENCE SIGNS 110, 120 perfectly orthogonal signals
115, 125 not perfectly orthogonal signal
130 amplitude (ordinate)
140 time (abscissa)
150 cross-correlation
210, 210 signals with perfect autocorrelation
215, 225 signals with imperfect autocorrelation
230 amplitude (ordinate)
240 time (abscissa)
255 main peak
256, 257 side lobes
290 cross-correlator
302 vehicle
305 transmitter
310 transmitted signal
320 reflected signal on carrier wave
325 person (target)
327 reflected signal
330 reflected signal on carrier wave
335 vehicle (target)
337 reflected signal
340, 341, 342 high-frequency signal
350 signal average
360 correlator
370 distance calculation function
380 sequence intervals plot
390 discrete Fourier transform (DFT)
395 frequency intervals plot
425 near field target
430 reflected signal from the field target
431 signal peak
432, 433 side lobe
435 far field target
440 reflected signal from far field target
500 receiver unit
505, 506 transmitter
515, 516 orthogonal digital-transmitter-signal
525 raw analog signal
530 down converter
540 analog to digital converter
550 filter unit
555 first sub-unit (match filter)
556 second sub-unit (mismatch filter)
600 receiver unit
700 receiver unit
756 mismatch filter
800 receiver system
870 angle-calculation-unit
910 filter design innermost nest first iteration
920 filter design step to update V
930 filter design least mean squares update step
1010, 1020 . . . 1050 method steps

The invention claimed is:

1. A receiver unit for use in a multiple-input-multiple output, MIMO, radar system having a plurality of transmitters each for transmitting one of a group of orthogonal digital-transmitter-signals on a carrier wave, the receiver unit configured and adapted to receive a raw-analog-signal on the carrier wave reflected from one or more target objects, the receiver unit comprising:

a down-converter configured to extract the raw-analog-signal from the carrier wave;
an analog-to-digital converter configured to derive a raw-digital-signal from the raw-analog-signal;
a plurality of mismatch filters, each mismatch filter associated with a different one of the digital-transmitter-signals, operable on the raw-digital-signal to cross-correlate the raw-digital-signal with a respective one of the digital-transmitter-signals and to reduce a magnitude of side-lobes associated with reflection-event-sequences in the raw-digital-signal; and
a time-frequency transform sub-unit, configured to identify a frequency associated with a reflection-event sequence.

2. The receiver unit of claim 1, wherein each of the plurality of mismatch filters cross-correlates the raw-digital-signal with the respective transmitter signal by comparing sections of the raw-digital-signal with a unit-sequence of the respective one of the digital-transmitter-signals.

3. The receiver unit of claim 1, wherein each of the plurality of mismatch filters is further designed to maximise a signal-to-noise-ratio, SNR, for a reflection event, thereby providing a correlation function between the raw-digital-signal and the respective one of the digital-transmitter-signals.

4. The receiver unit of claim 1, further comprising a coherent adder operable on the raw-analog-signal.

5. The receiver unit of claim 1, wherein the time-frequency transform sub-unit is configured to perform fast Fourier transforms, FFT.

6. A receiver system comprising a plurality of the receiver-units of claim 1 and further comprising an angle-calculation-unit configured to perform a FFT on an output of the time-frequency transform subunit and to determine an angle between a target object and a reference direction.

7. The receiver system of claim 6 further comprising a target-detection unit, configured to localise targets from the angle, an output of the time-frequency transform sub-unit, and a reflection-event sequence.

8. The receiver system of claim 6, comprising r receiver units and operable with a group of up to M transmitters, wherein each receiver unit comprises at least M filter units, each associated with a different one of the group of transmitters and having predetermined filter coefficients derived for the respective one of the digital-transmitter-signals.

9. The receiver system of claim 6, further comprising a respective transmitter circuit for use in each of the plurality of transmitters.

10. A receiver unit for use in a multiple-input-multiple output, MIMO, radar system having a plurality of transmitters each for transmitting one of a group of orthogonal digital-transmitter-signals on a carrier wave, the receiver unit configured and adapted to receive a raw-analog-signal on the carrier wave reflected from one or more target objects, the receiver unit comprising: a down-converter configured to extract the raw-analog-signal from the carrier wave; an analog-to-digital converter configured to derive a raw-digital-signal from the raw-analog-signal; a plurality of mismatch filters, each mismatch filter associated with a different one of the digital-transmitter-signals, operable on the raw-digital-signal to cross-correlate the raw-digital-signal with a respective one of the digital-transmitter- signals and to reduce a magnitude of side-lobes associated with reflection-event- sequences in the raw-digital-signal; a time-frequency transform sub-unit, configured to identify a frequency associated with a reflection-event sequence; and an angle-calculation-unit configured to determine an angle between a target object and a reference direction.

11. The receiver unit of claim 10, wherein each of the plurality of mismatch filters cross-correlates the raw-digital-signal with the respective one of the digital-transmitter-signals by comparing sections of the raw-digital-signal with a unit-sequence of the respective one of the digital-transmitter-signals.

12. The receiver unit of claim 10, wherein each of the plurality of mismatch filters is further designed to maximise a signal-to-noise-ratio, SNR, for a reflection event, thereby providing a correlation function between the raw-digital-signal and the respective one of the digital-transmitter-signals.

13. The receiver unit of claim 10, further comprising a coherent adder operable on the raw-analog-signal.

14. The receiver unit of claim 10, wherein the time-frequency transform sub-unit is configured to perform fast Fourier transforms, FFT.

* * * * *